(12) United States Patent
Gropp et al.

(10) Patent No.: US 11,299,071 B2
(45) Date of Patent: Apr. 12, 2022

(54) ADJUSTMENT DEVICE FOR THE LONGITUDINAL ADJUSTMENT OF A VEHICLE SEAT

(71) Applicant: Brose Fahrzeugteile GmbH & Co. Kommanditgesellschaft, Coburg, Coburg (DE)

(72) Inventors: Joerg Gropp, Boehlen (DE); Marcel Amstein, Marisfeld (DE); Jochen Hofmann, Marktgraitz (DE); Gregor Kroener, Bischberg (DE); Sandra Kieser, Coburg (DE); Fabian Rehmet, Kronach (DE)

(73) Assignee: BROSE FAHRZEUGTEILE GMBH & CO. KOMMANDITGESELLSCHAFT, COBURG, Coburg (DE)

( * ) Notice: Subject to any disclaimer, the term of this patent is extended or adjusted under 35 U.S.C. 154(b) by 348 days.

(21) Appl. No.: 16/323,494

(22) PCT Filed: Dec. 11, 2017

(86) PCT No.: PCT/EP2017/082119
§ 371 (c)(1),
(2) Date: Feb. 5, 2019

(87) PCT Pub. No.: WO2018/108762
PCT Pub. Date: Jun. 21, 2018

(65) Prior Publication Data
US 2021/0309129 A1    Oct. 7, 2021

(30) Foreign Application Priority Data

Dec. 14, 2016  (DE) .................... 10 2016 225 053.1

(51) Int. Cl.
*B60N 2/07* (2006.01)
*B60N 2/02* (2006.01)
(Continued)

(52) U.S. Cl.
CPC ............... *B60N 2/07* (2013.01); *B60N 2/005* (2013.01); *B60N 2/02* (2013.01); *B60N 2/0224* (2013.01);
(Continued)

(58) Field of Classification Search
CPC ...... B60N 2/1853; B60N 2/0232; B60N 2/12; B60N 2/164
See application file for complete search history.

(56) References Cited

U.S. PATENT DOCUMENTS 3,405,900 A * 10/1968 Robinson ............. B60N 2/1821
                                                    248/396
4,309,015 A *  1/1982 Muhr .................. B60N 2/0232
                                                    248/394
(Continued)

FOREIGN PATENT DOCUMENTS

CN     101020427 A    8/2007
CN     101298077 A    11/2008
(Continued)

OTHER PUBLICATIONS

European Extended Search Report dated Jun. 17, 2019 in corresponding Application No. 19155749.5-1010, 9 pages, with English translation, 4 pages.
(Continued)

*Primary Examiner* — Philip F Gabler
(74) *Attorney, Agent, or Firm* — Lewis Roca Rothgerber Christie LLP (57) ABSTRACT

It is provided an adjusting device for the longitudinal adjustment of a vehicle seat, comprising at least one rail for
(Continued)

defining a longitudinal seat axis along which a seat base of the vehicle seat is adjustable, and for supporting at least one adjusting unit of the adjusting device, and at least two shiftably guided adjusting units arranged one behind the other along the longitudinal seat axis, to which the seat base is to be fixed in order to be adjustable along the longitudinal seat axis. The at least two adjusting units are adjustable relative to each other along the longitudinal seat axis, and each adjusting unit is assigned a separate drive for the power-operated adjustment along the longitudinal seat axis.

19 Claims, 4 Drawing Sheets

(51) Int. Cl.
    *B60N 2/005* (2006.01)
    *B60N 2/06* (2006.01)
    *B60N 2/12* (2006.01)
    *B60N 2/16* (2006.01)
    *B60N 2/18* (2006.01)

(52) U.S. Cl.
    CPC .......... *B60N 2/0232* (2013.01); *B60N 2/06* (2013.01); *B60N 2/12* (2013.01); *B60N 2/164* (2013.01); *B60N 2/1635* (2013.01); *B60N 2/1695* (2013.01); *B60N 2/1803* (2013.01); *B60N 2/185* (2013.01); *B60N 2/1853* (2013.01); *B60N 2002/0212* (2013.01)

(56) References Cited

U.S. PATENT DOCUMENTS

| | | | |
|---|---|---|---|
| 5,048,886 A | 9/1991 | Ito et al. | |
| 5,106,144 A | 4/1992 | Hayakawa et al. | |
| 5,316,258 A | 5/1994 | Gauger et al. | |
| 5,462,337 A * | 10/1995 | Yamakami | B60N 2/0232 192/48.1 |
| 5,806,824 A * | 9/1998 | Isomura | B60N 2/1803 248/396 |
| 5,871,195 A * | 2/1999 | Gauger | B60N 2/181 248/419 |
| 5,924,668 A * | 7/1999 | Garrido | B60N 2/1803 248/419 |
| 6,217,115 B1 * | 4/2001 | Downey | B60N 2/08 248/421 |
| 6,352,006 B1 * | 3/2002 | Kurashita | B60N 2/0232 74/409 |
| 6,517,157 B1 * | 2/2003 | Vorac | B60N 2/0232 297/344.13 |
| 7,051,986 B1 | 5/2006 | Taubmann et al. | |
| 9,000,641 B2 | 4/2015 | Becker et al. | |
| 9,046,159 B2 * | 6/2015 | Becker | B60N 2/0747 |
| 9,855,865 B2 | 1/2018 | Supernavage et al. | |
| 10,442,322 B2 * | 10/2019 | Handigol | B60N 2/0232 |
| 10,507,744 B2 * | 12/2019 | Kim | B60N 2/34 |
| 2001/0005003 A1 | 6/2001 | Koga et al. | |
| 2002/0021016 A1 | 2/2002 | Bergquist et al. | |
| 2003/0011226 A1 * | 1/2003 | Schooler | B60N 2/0296 297/330 |
| 2006/0213302 A1 | 9/2006 | Hoffmann et al. | |
| 2006/0237987 A1 | 10/2006 | Nakamura et al. | |
| 2007/0205626 A1 | 9/2007 | Ohtsubo et al. | |
| 2007/0252420 A1 * | 11/2007 | Dungey | B60N 2/067 297/330 |
| 2008/0231090 A1 | 9/2008 | Takeda et al. | |
| 2011/0031774 A1 | 2/2011 | Koga | |
| 2011/0079699 A1 * | 4/2011 | Tarusawa | B60N 2/067 248/430 |
| 2012/0007401 A1 | 1/2012 | Hashimoto | |
| 2012/0145867 A1 | 6/2012 | Benthien et al. | |
| 2012/0205511 A1 * | 8/2012 | Hofmann | B60N 2/0715 248/429 |
| 2012/0325033 A1 | 12/2012 | Bosecker et al. | |
| 2013/0113247 A1 | 5/2013 | Magnus et al. | |
| 2014/0123783 A1 | 5/2014 | Geiges | |
| 2014/0175249 A1 | 6/2014 | Becker et al. | |
| 2015/0165935 A1 | 6/2015 | Sachs et al. | |
| 2015/0210187 A1 | 7/2015 | Harleb et al. | |
| 2016/0039313 A1 | 2/2016 | Kuroda | |
| 2017/0166093 A1 | 6/2017 | Cziomer et al. | |
| 2020/0231068 A1 * | 7/2020 | Gropp | B60N 2/0232 |
| 2020/0269730 A1 * | 8/2020 | Gropp | B60N 2/1635 |

FOREIGN PATENT DOCUMENTS

| | | |
|---|---|---|
| CN | 101987584 A | 3/2011 |
| CN | 102653248 A | 9/2012 |
| CN | 102700438 A | 10/2012 |
| CN | 103538497 A | 1/2014 |
| CN | 103717444 A | 4/2014 |
| CN | 104802666 A | 7/2016 |
| DE | 19815283 A1 | 10/1999 |
| DE | 102004055643 A1 | 5/2006 |
| DE | 102006000193 A1 | 10/2006 |
| DE | 112007003011 T5 | 11/2009 |
| DE | 102009038126 A1 | 2/2011 |
| DE | 102010001847 A1 | 8/2011 |
| DE | 102014225358 A1 | 6/2015 |
| DE | 10 2016 224 663 A1 | 6/2017 |
| EP | 0 638 026 A1 | 2/1995 |
| EP | 2 730 456 A1 | 5/2014 |
| EP | 2 985 174 A1 | 2/2016 |
| FR | 2 801 543 | 6/2001 |
| JP | H 08310285 A | 11/1996 |
| KR | 10-2012-0070525 | 6/2012 |
| KR | 10-2013-0029413 | 3/2013 |
| KR | 10-2015-0011365 | 1/2015 |
| WO | WO 00/41911 | 7/2000 |
| WO | WO 02/074589 A1 | 9/2002 |
| WO | WO 2005/015054 A1 | 2/2005 |
| WO | WO 2008/073028 A1 | 6/2008 |

OTHER PUBLICATIONS

KR Notice of Allowance dated Mar. 22, 2021 issued in corresponding KR Application No. 10-2019-7020396, 4 pages (with brief English translation).

German Search Report issued in corresponding German Application No. DE 10 2016 015 923.5 dated Dec. 15, 2020, 7 pages, with English translation, 2 pages.

Chinese Office action dated May 24, 2021 issued in corresponding Chinese Application No. 201780074626.9, 5 pages.

First CN Office action dated Jun. 15, 2021 issued in corresponding CN Application No. 201910576002.8, 8 pages, with English translation, 4 pages.

First CN Office action dated Dec. 2, 2021 issued in corresponding CN Application No. 202010285600.2, 9 pages; with English translation, 4 pages.

First CN Office action dated Dec. 27, 2021 issued in corresponding CN Application No. 202010285599.3, 7 pages, with English translation 2 pages.

* cited by examiner

FIG 4

ADJUSTMENT DEVICE FOR THE LONGITUDINAL ADJUSTMENT OF A VEHICLE SEAT

CROSS-REFERENCE TO A RELATED APPLICATIONS

This application is a National Phase Patent Application of International Patent Application Number PCT/EP2017/082119, filed on Dec. 11, 2017, which claims priority of German Patent Application Number 10 2016 225 053.1, filed on Dec. 14, 2016, the entire contents of all of which are incorporated herein by reference.

BACKGROUND

This disclosure relates to an adjusting device for the longitudinal adjustment of a vehicle seat.

An adjusting device commonly used in practice includes among other things a first rail provided for attachment to a vehicle floor and a second rail provided for connection to a seat base of the vehicle seat. The second rail is adjustably mounted relative to the first rail in order to provide for a longitudinal adjustment of the vehicle seat along a longitudinal direction of the seat. Usually, a vehicle seat includes two pairs of first and second rails via which the vehicle seat is longitudinally shiftably arranged on the vehicle floor. For adjusting the second rail relative to the first rail, the adjusting device regularly includes an (adjusting) spindle and a spindle nut meshing with the spindle.

When using a rigid second rail, to which the seat base is fixed, a longitudinal adjustment of the vehicle seat exclusively is possible via the adjusting device. Additional possibilities for adjustment then can only be depicted via components adjustably mounted on the seat base. Adjusting devices known in this respect are disclosed for example in DE 198 15 283 A1 and WO 2005/015054 A1. The spindle drives with spindle and spindle nut meshing therewith, which each are provided here, usually include a common, for example electromotive drive, in order to synchronously adjust frame-mounted (second) rails each associated with a long side of the seat relative to a pair of floor-mounted (first) rails in a power-operated way.

In the adjusting devices with spindle drive known from the prior art the assembly in part also is extremely complex, and hence a maintenance or repair is hardly possible. Moreover, some adjusting devices with spindle drive are comparatively susceptible to impurities and damages in the region of the ends of the used rail(s).

SUMMARY

Proceeding from the above-mentioned prior art it is an object underlying the concrete solution to provide an improved adjusting device for the longitudinal adjustment, which for example offers additional possibilities for an adjustment of the vehicle seat and/or which constitutes an improvement with regard to the stability and mountability.

This object is achieved with adjusting devices as described herein.

According to a first aspect, there is proposed an adjusting device for the longitudinal adjustment of a vehicle seat, which among other things includes at least one rail that is provided to define a longitudinal seat axis, along which a seat base of the vehicle seat is adjustable, and to support at least one adjusting unit of the adjusting device. In addition, the adjusting device comprises at least two shiftably guided adjusting units arranged one behind the other along the longitudinal seat axis, to which the seat base—for example via one rocker each—is to be fixed in order to be adjustable along the longitudinal seat axis. The at least two adjusting units are adjustable relative to each other along the longitudinal seat axis and each adjusting unit is assigned a separate drive for the power-operated adjustment along the longitudinal seat axis.

In the solution according to the first aspect at least two adjusting units thus are assigned to one of the two long sides of a seat, hence are not rigidly coupled with each other, but are adjustable relative to each other along the longitudinal seat axis in a power-operated way. Each adjusting unit therefor is assigned a separate drive, so that by actuating the different drives—and hence not by mechanically decoupling the two adjusting units—a distance of the two adjusting units along the longitudinal seat axis can be varied. In this way, at least one additional possibility for adjustment of the vehicle seat and in particular of its seat base can be provided via the adjusting device, without having to provide additional components therefor. Rather, via the adjusting units provided relative to each other and on the right or left long side of a seat the vehicle seat not only is longitudinally adjustable, but in addition also is adjustable in its orientation with respect to the vehicle floor.

The adjusting unit can include a bearing part for the connection to a rocker of the seat base. Such a rocker for example then is articulated to the bearing part of the adjusting unit and also to a component of the seat base in order to provide for an adjustment of the inclination of the seat base via the adjusting units adjustable relative to each other along the longitudinal seat axis.

For the power-operated adjustment of at least one adjusting unit a spindle and a spindle nut meshing therewith can be provided. For the adjustment of at least one adjusting unit a spindle drive thus is provided, in which the (adjusting) spindle usually extends along the longitudinal seat axis.

In one design variant, a separate spindle drive with a spindle each and a spindle nut associated with the respective adjusting unit can also be assigned to the individual adjusting units provided with a separate, preferably electromotive drive. To use as little different components as possible and to simplify the assembly of the adjusting device, a common, stationary spindle is provided in one design variant for the power-operated adjustment of the at least two adjusting units, two spindle nuts each assigned to an adjusting unit meshing with said spindle. By using an individual (rail-mounted) spindle, along which the at least two adjusting units are adjustable by means of their respectively associated rotatable spindle nut, an adjustment path as large as possible moreover can easily be represented along the longitudinal seat axis, in that both adjusting units can be adjusted jointly or relative to each other along almost the entire length of the individual spindle.

In one design variant, a longitudinal axis of the spindle extends substantially perpendicularly to a drive axis of the drive of an adjusting unit. This in particular includes the fact that a drive shaft of an electromotive drive extends substantially perpendicularly to the longitudinal axis of the spindle with which a spindle nut driven by the drive meshes to perform a rotation. The transmission of a driving torque provided by the drive for the adjustment of the respective adjusting unit hence is effected here via a correspondingly designed adjusting gear unit including the spindle nut.

For controlling the adjusting movements of the at least two adjusting units relative to each other, an (individual) electronic control unit, for example in the form of a controller to be arranged on the seat base, can be provided. Such an electronic control unit then for example is equipped to vary a distance of the at least two adjusting units arranged one behind the other relative to each other along the longitudinal seat axis for a variation of an inclination and/or a height of the seat base and/or a seat cushion arranged thereon. Thus, for example each drive of the adjusting units can be actuated independently via the electronic control unit in order to shift the adjusting units towards each other or away from each other along the longitudinal seat axis. This in particular includes the fact that the electronic control unit is equipped to actuate merely one of the drives of the different adjusting units arranged one behind the other along the longitudinal seat axis so that the associated adjusting unit is shifted relative to at least one stationary adjusting unit of the adjusting device along the longitudinal seat axis. Such an adjustment can be provided for example for setting an inclination of the seating surface of the vehicle seat by maintaining the set longitudinal seat position.

In one design variant, the at least two adjusting units are shiftably mounted on one and the same rail. In particular, in this variant the use of an individual continuous spindle fixed to this rail then is recommendable for the at least two adjusting units. In an alternative design variant, however, the at least two adjusting units in principle can also be shiftably mounted on different rails.

In one exemplary embodiment, at least one adjusting unit of the adjusting device is shiftably mounted on the at least one rail via at least one supporting element. With the supporting element, the adjusting unit thus includes an additional component that ensures the shiftable support on the at least one rail. The supporting element for example can slidingly rest against the rail and hence be configured in the manner of a slider and be shiftable along the rail. Alternatively or in addition, the at least one supporting element can be rotatably mounted and perform a rotary movement for shifting the adjusting unit along the longitudinal seat axis. Such a supporting element hence for example includes a roll or roller, which by rolling off on the rail or a component connected thereto permits shifting of the adjusting unit along the longitudinal seat axis when the adjusting unit therefor is driven by the drive.

The at least one supporting element in principle can be supported on the rail or a component connected thereto in order to define a defined position on the rail for the adjusting unit and support a rattle-free adjustment of the adjusting unit along the rail.

In a possible development, the at least one supporting element is supported on a convexly curved guide profile that is integrally formed with the rail or that is configured as a separate component and is connected to the rail. A corresponding guide profile can be arranged for example to extend above or below the spindle. In a variant based thereon, for example two comparably or identically configured guide profiles are provided on the rail in order to provide for a support of a supporting element or a plurality of (at least two) supporting elements in different directions. In one design variant, for example, a first guide profile extending below a spindle and a second guide profile extending above the spindle and hence opposite the first guide profile are provided on the rail. Instead of guide profiles offset relative to each other by 180° with respect to a longitudinal axis of the spindle, alternatively offset guide profiles can also be provided on the rail, for example guide profiles offset relative to each other by 90°.

In particular in the case of a relatively long spindle for the adjustment of one or more of the adjusting units it can be advantageous when the spindle is supported on the at least one supporting element of an adjusting unit. For example, when an adjusting unit always is present between two spindle ends of the spindle, which is fixed to the rail via a spindle holder, an undesired deflection of the spindle can be prevented or at least be reduced considerably via an adjusting unit with a supporting element supporting the spindle. In one design variant, for example, the use of a spindle that has a length of more than 1 m and provides for an adjustment of a vehicle seat between the first and the second seat row of the vehicle hence is easily possible without having to additionally provide supporting points along the spindle axis to avoid an undesired deflection of the spindle. Here, a sufficient support transversely to the longitudinal axis of the spindle can rather by achieved via the at least one supporting element of the adjusting unit adjustable along the spindle. In line with the variant explained above, in particular the supporting element in turn can be supported on the rail or a component connected thereto above and/or below the spindle in order to dissipate transverse forces from the seat base into the rail and hence into the vehicle floor, when the vehicle seat is properly fixed to the adjusting device.

In one exemplary embodiment two supporting elements are provided on an adjusting unit, which each provide for a support of the adjusting unit and hence of the seat base to be connected thereto on the rail or a component connected thereto. In a development based thereon a spindle provided for the adjustment of an adjusting unit or of at least two adjusting units extends through between at least two supporting elements of an adjusting unit. Via the at least two supporting elements, a support of the spindle thus is given in different directions.

For example, at least two pairs of two supporting elements each arranged one behind the other along the longitudinal seat axis are provided on an adjusting unit so that the spindle extends through between these at least two pairs. Thus, the spindle is supported on the adjusting unit on two areas spaced apart from each other along the longitudinal seat axis in different directions in space—preferably opposite to each other—via the supporting elements at the rail. Not only the guidance of the respective adjusting unit along the spindle is improved thereby, but in addition a defined support of the spindle on two areas of the adjusting unit spaced apart from each other is achieved thereby.

In one design variant, the spindle nut meshing with the spindle is rotatably supported between the at least two pairs of supporting elements of an adjusting unit. In this variant, two pairs of supporting elements hence are provided on both sides (based on the longitudinal seat axis) of the spindle nut of an adjusting unit. Via the supporting elements, the adjusting unit is supported on the rail or on a component connected thereto on both sides of the spindle nut.

The spindle likewise can be supported on the adjusting unit (and thereby on the rail or a component connected thereto) via the supporting elements on both sides of the spindle nut.

A spindle nut of an adjusting unit for example can be part of an adjusting gear unit, which is at least partly accommodated in a gear unit housing and is coupled to the drive of the respective adjusting unit. The gear unit housing can at least partly be formed by two bearing plates facing each other transversely to the longitudinal seat axis, on which at least one rotatable supporting element is mounted. In an alternative design variant the gear unit housing is fixed to two bearing plates facing each other, for example by means of welding, on which at least one rotatable supporting element is mounted. Thus, in the above first-mentioned case, the respective gear unit housing in particular is defined via the opposed bearing plates, while in the last-mentioned case the gear unit housing can be manufactured separately and subsequently is received between the two bearing plates during the assembly of the adjusting device. The gear unit housing with the bearing plates and the one or more supporting elements in principle can (completely) be protectively received in a cavity defined by the at least one rail.

Another aspect of the concrete solution is the provision of an adjusting device for the longitudinal adjustment of a vehicle seat, in which a spindle holding member for a shiftably guided adjusting unit is fixed to the rail. A portion of the spindle here is held at the spindle holding member and (a) an end of the rail is closed by the spindle holding member and/or (b) the spindle holding member is releasably fixed in the rail via at least one separate fastening element, such as for example a screw or a bolt.

Initially, it is irrelevant here whether the adjusting unit, which for setting a longitudinal seat position of the vehicle seat is adjustable by means of the spindle, is provided with a separate drive and possibly is provided in addition to a further, separate adjusting unit with separate drive. A spindle holding member according to this aspect can, however, easily be combined with the aforementioned first aspect, which provides at least two adjusting units adjustable separately and relative to each other along the longitudinal seat axis, each with their own drive.

The provision of a spindle holding member, via which an end of the rail additionally is closed, here offers the additional advantage of stiffening the preferably floor-mounted rail at its end, without having to provide an additional element therefor. This function rather is assumed by the spindle holding member, via which the preferably stationary spindle is fixed to the rail. Closing the spindle end by means of the spindle holding member also minimizes the risk that impurities get into a cavity defined by the rail, in which for example the spindle is arranged.

The releasable fixation of the spindle holding member in the rail via the at least one separate fastening element, which is provided alternatively or in addition, facilitates the maintenance and repair of the adjusting device as compared to previously used welded spindle holders. In particular in combination with separately adjustable adjusting units with their own drive each, a releasably fixed spindle holding member also permits simplified mounting and demounting of an adjustable part. When the spindle holding member is not mounted yet, an individual adjusting unit can easily be placed on the rail or be removed from the same. In the mounted condition, a spindle holding member then mechanically limits the admissible adjustment path for an adjusting unit and prevents its removal from the rail.

The spindle holding member can be releasably fixed in the rail via at least one screw or bolt connection. In a variant based thereon, screws or bolts introduced laterally and hence transversely to the longitudinal axis of the spindle can be provided for the releasable fixation of the spindle holding member in the rail. The screws or bolts thereby are accessible more easily.

In one design variant, the spindle holding member is positively received between two—for example plate- or disk-shaped—arresting elements that are arranged opposite each other in a cavity of the rail. Via the arresting elements the spindle holding member, to which a portion of the spindle is fixed, hence is additionally held in a defined position in the rail. The fixation via the at least one separate fastening element then in particular serves to secure a positive connection between an arresting element and the spindle holding member. Via the positive connection between an arresting element and the spindle holding member in particular the position of the spindle holding member axially and/or transversely to the longitudinal axis of the spindle can be defined.

Another aspect of the concrete solution is a vehicle seat with at least one adjusting device as described herein.

In an exemplary embodiment, the at least one rail and at least one adjusting unit of the adjusting device can be arranged below a floor of the vehicle so that the adjusting mechanism for the seat base is accommodated in a region below the floor and is not visible from outside. The floor then preferably includes a longitudinally extended cutout, for example in the form of an oblong (floor) slot along the longitudinal seat axis. Then, e.g. merely a bearing part of the adjusting unit for the connection of the seat base to the adjusting unit protrudes from the cutout at the floor of the vehicle. This bearing part for example provides a screw and/or articulation point for a rocker of the seat base. By means of the bearing part protruding from the floor of the vehicle, the seat base thus can be fixed via a rocker. The rails and the adjusting unit(s) shiftably guided thereon are mounted however below the floor (apart from the bearing part).

In one design variant, the vehicle seat is adjustable by means of the at least one adjusting device along the longitudinal seat axis between a position in a first seat row and a position in a second seat row of the vehicle. The adjusting device thus for example provides a sufficiently long rail and possibly a sufficiently long spindle along which the seat base is adjustable from the front to the rear and from the rear to the front.

In one design variant, the vehicle seat includes two adjusting devices each with at least two adjusting units arranged one behind the other along the longitudinal seat axis, to each of which a separate drive is assigned for the power-operated adjustment. Via the two adjusting devices designed corresponding to the first aspect of the solution, a total of at least four drives thus are provided. These drives then are actuatable in pairs and/or individually in order to set an inclination and/or a height of the seat base or of a cushion support arranged thereon relative to a floor of a vehicle by means of the two adjusting devices. In such a vehicle seat an inclination and/or height adjustment of the seat base without additional components hence is achieved solely via the independently actuatable adjusting devices that are independently adjustable along the longitudinal seat axis.

Via the different adjusting devices an egress position can be defined for example, in which the seat base is inclined forwards comparatively strongly in order to facilitate an egress from the vehicle for a seat user. Alternatively or in addition, the seat base can be inclined rearwards into a comfort or relax position, among other things by rearwardly adjusting two (front) adjusting units connected to the seat base relative to stationary (rear) adjusting units. The rear adjusting units each are arranged behind the front adjusting units of a long side of the seat along the longitudinal seat axis. When the individual adjusting units of the different long sides of a seat are actuated synchronously, the seat base is completely shifted along the longitudinal seat axis without a change in inclination or height. Via an individual actuation of individual adjusting units a further variation of the adjustment position of the seat base furthermore can be achieved. In any case, via the use of independently actuatable adjusting units an additional flexibilization is achieved for the adjustment of a seat base.

BRIEF DESCRIPTION OF THE DRAWINGS

The attached Figures by way of example illustrate possible design variants.

DETAILED DESCRIPTION

FIGS. 1, 2, 3A and 3B by way of example show an exemplary embodiment of an adjusting device 1A. The same is part of a rail assembly SA of a vehicle seat F of FIG. 4. The adjusting device 1A by way of example represents a mirror-symmetrically configured adjusting device 1B of the rail assembly SA, which corresponding to FIG. 4 is provided on the other (right-hand) seat long side of the vehicle seat F.

The vehicle seat F includes a seat base G and a backrest R pivotally mounted thereon. Via the rail assembly SA the seat base G and hence the vehicle seat F is shiftable along a longitudinal seat axis L, and hence a longitudinal seat position of the vehicle seat F is adjustable. The connection of the seat base B to the adjusting devices 1A and 1B of the rail assembly SA is effected at bearing parts 20 (cf. FIGS. 1, 2, 3A and 3B). These bearing parts 20 each are part of an adjusting unit of the respective (left or right) adjusting device 1A or 1B configured as carriage 2.1 or 2.2. The individual carriages 2.1, 2.2 of the adjusting devices 1A and 1B protrude from a floor B of a vehicle, in which the vehicle seat F is properly mounted, merely with the bearing part 20. The remaining components of the adjusting devices 1A and 1B are accommodated below the floor B so that in particular a (single) rail 3 of an adjusting device 1A or 1B, on which the carriages 2.1 and 2.2 are shiftably mounted, is fixed below the floor B. The bearing parts 20, on which the seat base G is mounted for example each via a rocker articulated to the seat base G and the respective bearing part 20, protrude from continuous floor slots BS1 and BS2 extending parallel to the longitudinal seat axis L. The floor slots BS1 and BS2 can also extend along the floor B with such a length that the vehicle seat F can be traversed between a position in the first seat row of the vehicle and a position in the second seat row of the vehicle. For this purpose, each rail 3 of the two adjusting devices 1A and 1B then possibly would have to be designed correspondingly longer in order to provide for an adjustment of the carriages 2.1 and 2.2 between the different positions in the first and second seat rows.

As shown with reference to the adjusting device 1A of FIGS. 1, 2 and 3A to 3B, each adjusting device 1A, 1B has a single rail 3 on which two carriages 2.1 and 2.2 with their own electromotive drive 4.1 or 4.2 each are shiftably held. The carriages 2.1 and 2.2 arranged one behind the other on the rail 3 along the longitudinal seat axis L are adjustable relative to each other via the drives 4.1 and 4.2 so that a distance between the two carriages 2.1 and 2.2 is variable along the longitudinal seat axis L in order to thereby adjust for example an inclination and/or height of the seat base G. The drives 4.1 and 4.2 are actuatable relative to each other via an electronic control unit SE to perform a corresponding adjusting movement. In addition, a synchronous adjustment of both carriages 2.1 and 2.2 also is possible in order to completely shift the seat base G along the rail 3.

Figure 4:
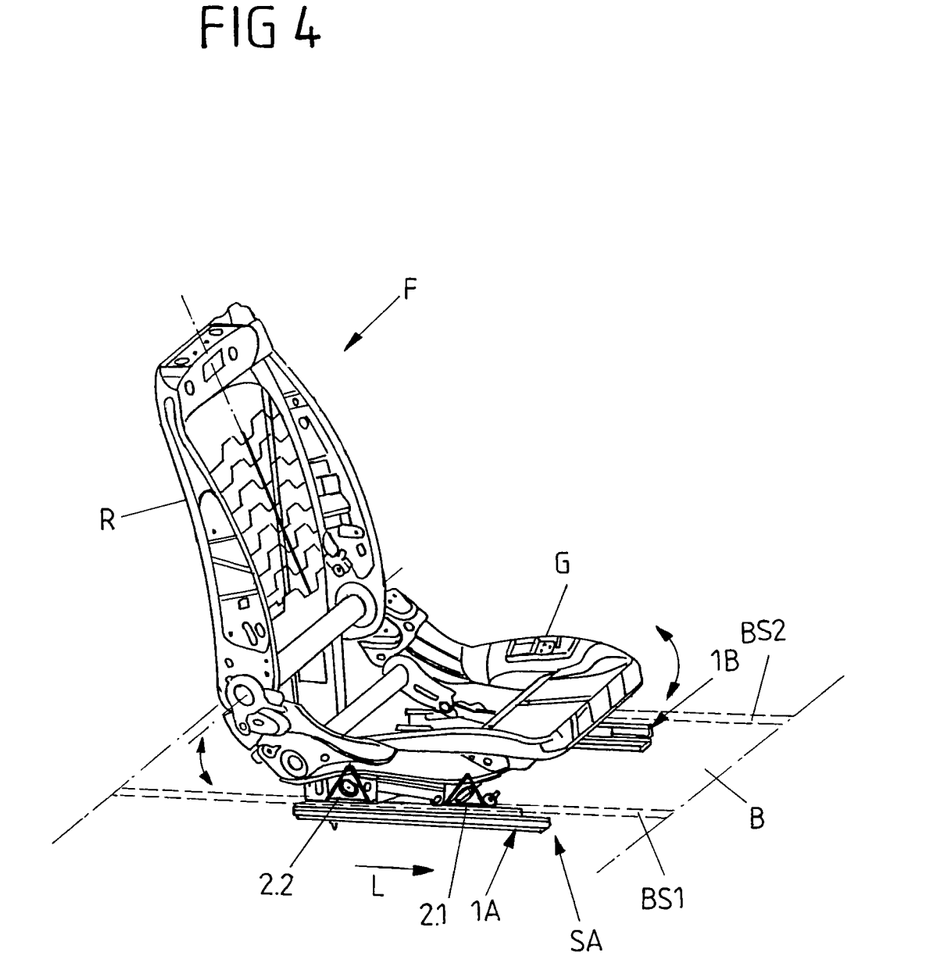
FIG. 4 shows a vehicle seat with two adjusting devices according to FIGS. 1 to 3B, which each are almost completely accommodated under a floor of a vehicle.

For the connection of the seat base G to the bearing parts 20 protruding from the floor slot BS1 in the properly mounted condition of the adjusting device 1A corresponding to FIG. 4 both carriages 2.1 and 2.2 each include an articulation point/screw point 200. This articulation point/screw point 200 is provided for the connection and articulation of a rocker.

To a flange portion 21 of the bearing part 20 the drive 4.1 or 4.2 furthermore is flange-mounted so that the respective drive 4.1 or 4.2 laterally protrudes from the rail 3 and its drive axis extends perpendicularly to the longitudinal seat axis L and hence to the direction of longitudinal extension of the rail 3. On an outer housing of the respective drive 4.1 or 4.2 a connection socket 40 for the connection of the electronic control unit SE is accessible. Each drive 4.1 or 4.2 furthermore includes a drive shaft for rotating a spindle nut 801. This spindle nut 801 meshes with a spindle 7 that extends parallel to the longitudinal seat axis L within the rail 3. The spindle nut 801 each is part of an adjusting gear unit 8 cooperating with the associated drive 4.1 or 4.2.

This adjusting gear unit 8 each comprises a gear unit housing 80 in which a drive worm 800 is rotatably mounted. This drive worm 800 is driven via the respective drive 4.1 or 4.2 and meshes with an external toothing of the spindle nut 801. At the same time, the spindle nut 801 meshes with the spindle 7 via an internal toothing so that a torque applied by the respective drive 4.1 or 4.2 is converted into a rotary movement of the spindle nut 801 about a longitudinal axis of the spindle 7 via the drive worm 800. The rotation of the spindle nut 801 in turn leads to an adjusting movement of the associated carriage 2.1 or 2.2 along the longitudinal seat axis L.

In the present case, the gear unit housing 80 on the one hand is received between two holding plates 81.1 and 81.2 and for example fixed to the same, possibly by welding. The holding plates 81.1 and 81.2 face each other along the longitudinal seat axis L and include a through opening for the spindle 7 extending through the holding plates 81.1 and 81.2. Both carriages 2.1 and 2.2 hence are adjustable along a common spindle 7, namely via their independent drives 4.1 and 4.2 synchronously in one and the same adjustment direction and relative to each other, in particular in different adjustment directions.

For the shiftable support on the rail 3, each carriage 2.1 or 2.2 includes a plurality of supporting elements in the form of rotatably mounted rollers 22, 23, 24 and 25. These rollers 22 to 25 are arranged in pairs on both sides of the respective adjusting gear unit 8. The adjusting gear unit 8 with the spindle nut 801 hence is disposed between two pairs of two rotatable rollers 22/25 and 23/24 each. The spindle 7 extends through between the two rollers 22/25 or 23/24 of a pair and is supported by these rollers 22/25 and 23/24 arranged above and below the spindle 7. The rollers 22 to 25 of each carriage 2.1 or 2.2 thus counteract a deflection of the spindle 7—in particular in the case of a particularly long spindle 7.

At the same time, above (in the case of the rollers 22 and 23) or below (in the case of the rollers 24 and 25) the spindle 7 the rollers 22 to 25 are supported on a guide profile in the form of a semicircular profile 5.1 or 5.2, which is firmly connected to the rail 3 or formed integrally with the rail 3. The rollers 22 to 25 thereby support transverse forces from the seat base G and dissipate the same into the rail 3. The individual rollers 22 to 25 have a convexly curved running surface LF (cf. in particular FIG. 3B) via which each roller 22 to 25 can roll off on the one hand on the respective semicircular profile 5.1 or 5.2 and on the other hand on the spindle 7, when the carriage 2.1 or 2.2 is shifted along the spindle 7 and hence along the rail 3.

The total of four rollers 22 to 25 of a carriage 2.1 or 2.2 are rotatably mounted on two bearing plates 60 and 61 facing each other transversely to the longitudinal seat axis L. These bearing plates 60 and 61 together with the rollers 22 to 25 mounted thereon form a roller assembly 6 of the respective carriage 2.1 or 2.2. This roller assembly 6 is completely received in a cavity 30 of the rail 3 and ensures the shiftability of the respective carriage 2.1 or 2.2 on the rail 3.

The adjusting gear unit 8 with the drive worm 800 and the spindle nut 801 is arranged between the bearing plates 60 and 61. The holding plates 81.1 and 81.2 connected to the gear unit housing 80 can be welded to the lateral bearing plates 60, 61. In an alternative design variant no separate gear unit housing 80 is provided for the rotatable support of the drive worm 800 and the accommodation of the spindle nut 801. Rather, a housing for the drive worm 800 and the spindle nut 801 then is formed by the bearing plates 60 and 61 and the holding plates 81.1 and 81.2.

To ensure a connection of the electromotive drive 4.1 or 4.2 of the respective carriage 2.1 or 2.2 to the roller assembly 6 and the adjusting gear unit 8 and to be able to shift the same along the rail 3, the rail 3 is designed open on a long side. In the properly mounted condition of the adjusting device, this open long side is provided on the inside and hence faces an inside of the other adjusting device 1B of the rail assembly SA for the vehicle seat F.

For the assembly of an adjusting device 1A, the individual carriages 2.1 and 2.2 with their bearing part 20, the drive 4.1 or 4.2 flange-mounted thereto, the adjusting gear unit 8 coupled to the drive 4.1 or 4.2 and the roller assembly 6 can be pre-mounted and form a pre-mounted assembly. The individual carriages 2.1 and 2.2 with their roller assembly 6 then are pushed into the rail 3 from an end of the rail 3 and properly positioned on the rail 3 via the spindle nut 801 meshing with the spindle 7. The semicircular profiles 5.1 and 5.2 facing each other and arranged above and below the spindle 7 on the one hand ensure both a defined guidance of the carriages 2.1 and 2.2 within the rail 3 and a support of the transverse forces introduced by the seat base G. At the same time, a support of the spindle 7 in a middle region between two spindle ends is achieved via the roller pairs 22/25 and 23/24 spatially arranged at a distance to each other along the longitudinal seat axis L, between which the adjusting gear unit 8 of a carriage 2.1 or 2.2 is received.

At the ends of the rail 3 a spindle holder 9 each is provided. At this spindle holder 9 the stationary spindle is held and fixed within the rail 3. The spindle holder 9 includes a spindle holding member in the form of a spindle holding plate 90. Via this spindle holding plate 90 the spindle 7 is held stationary in the rail 3 and secured against rotating about its longitudinal axis.

For easier assembly and disassembly, the spindle holding plate 90 in the present case is releasably fixed to the rail 3 via a plurality of fastening elements in the form of screws 92. Two screws 92 are provided laterally on the rail 3 and screwed in on a (left) side wall 32 of the rail 3. Two further screws 92 are screwed in on the other (right) side of the rail 3, here each on an upper and a lower edge web 31o or 31u that borders the open long side of the rail 3.

Via the individual screws 92 an arresting element in the form of an arresting plate 91a or 91b each is fixed, which is positively connected to the spindle holding plate 90 and holds the same in position within the rail 3. Via the two arresting plates 91a and 91b facing each other transversely to the longitudinal seat axis L the spindle holding plate 90 (with the screws 92 screwed in) is immovably fixed at one end of the rail 3 and releasably within the rail 3.

Figure 1:
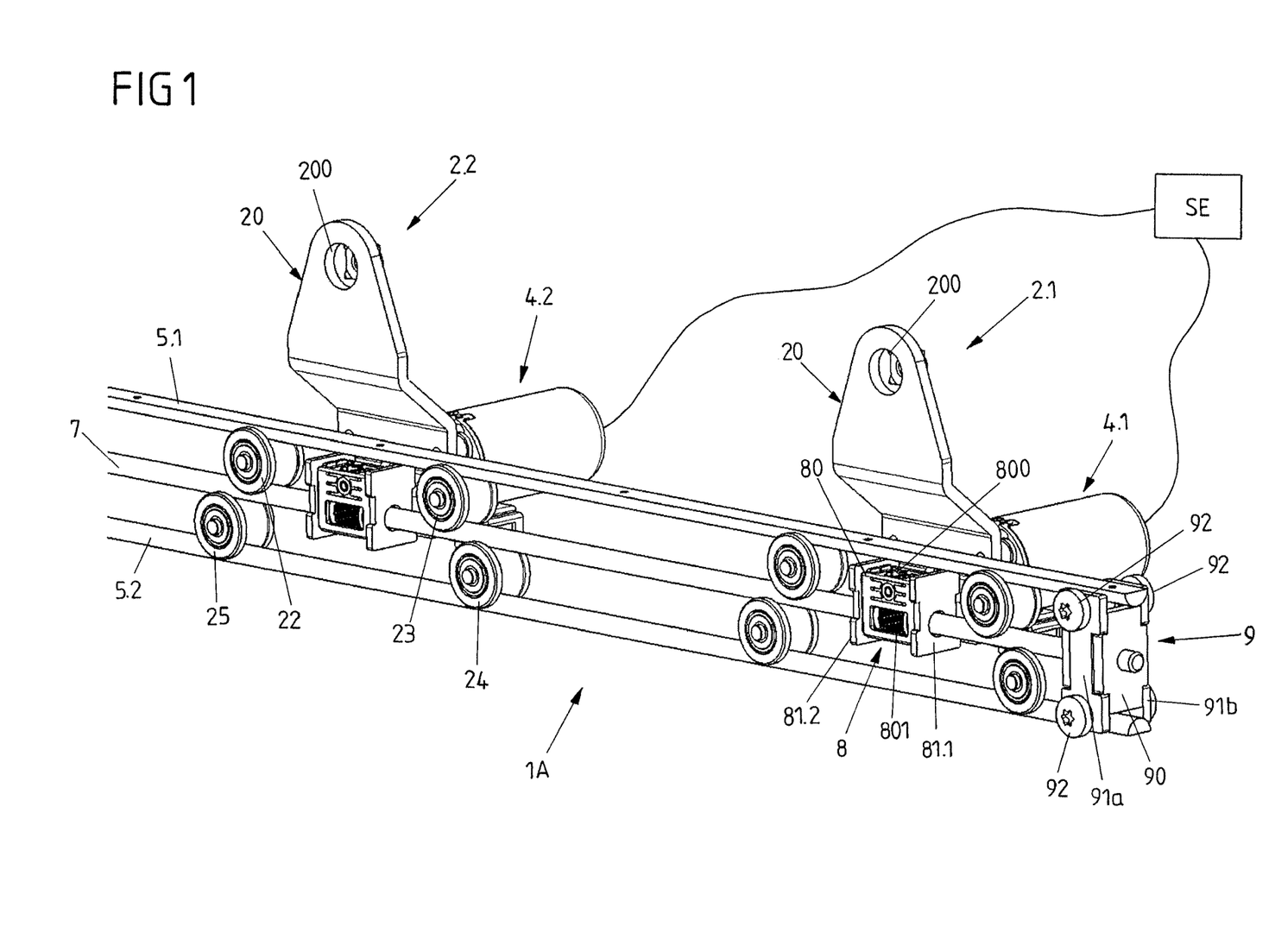
FIG. 1 sectionally shows an exemplary embodiment of an adjusting device comprising two adjusting units adjustably held on a common spindle with their own electromotive drive each, to each of which a seat base can be fixed (without representation of a rail of the adjusting device).
Figure 2:
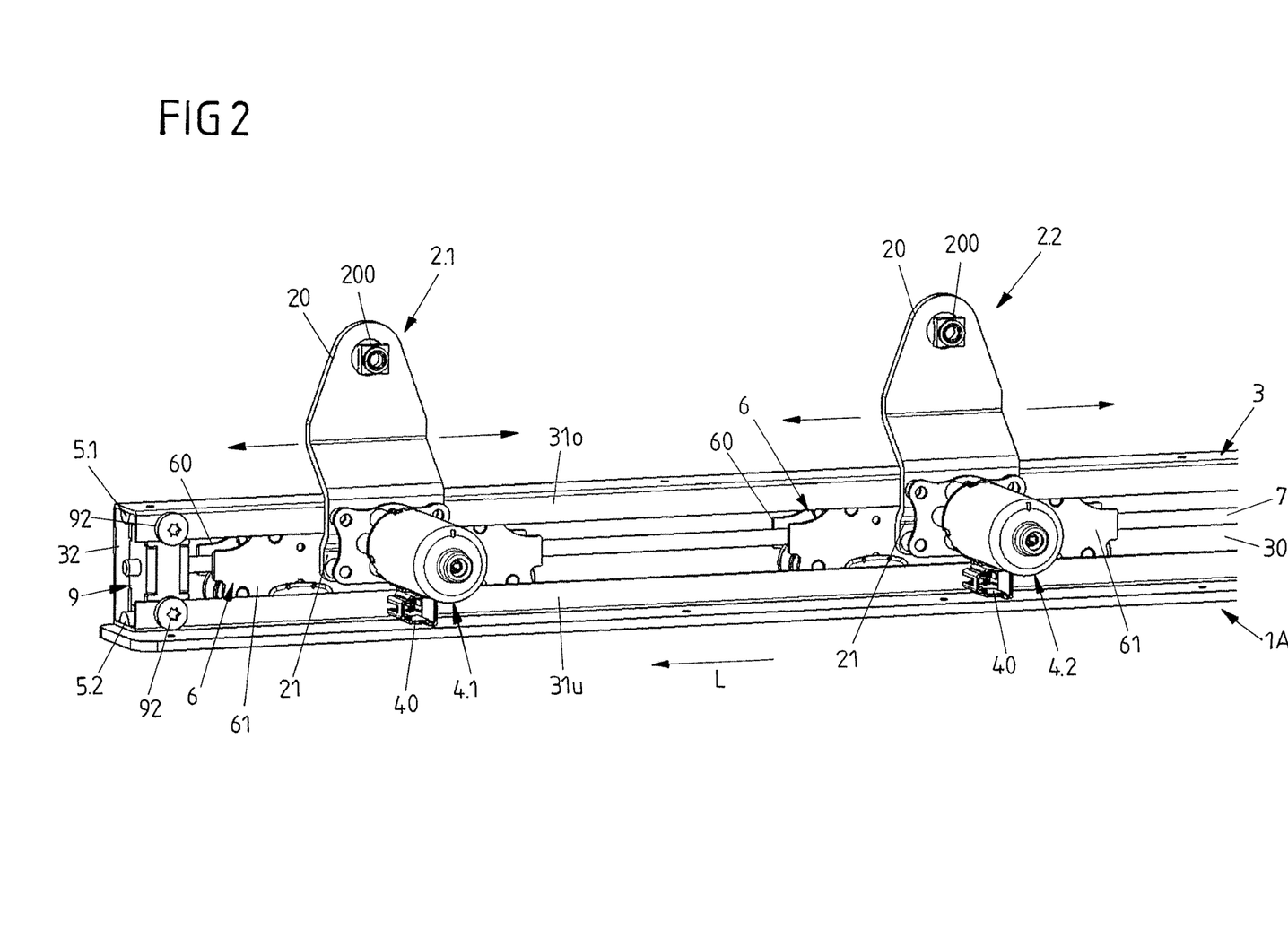
FIG. 2 shows the adjusting device of FIG. 1 with a view from the opposite side and with a representation of the rail of the adjusting device.
Figure 3A:
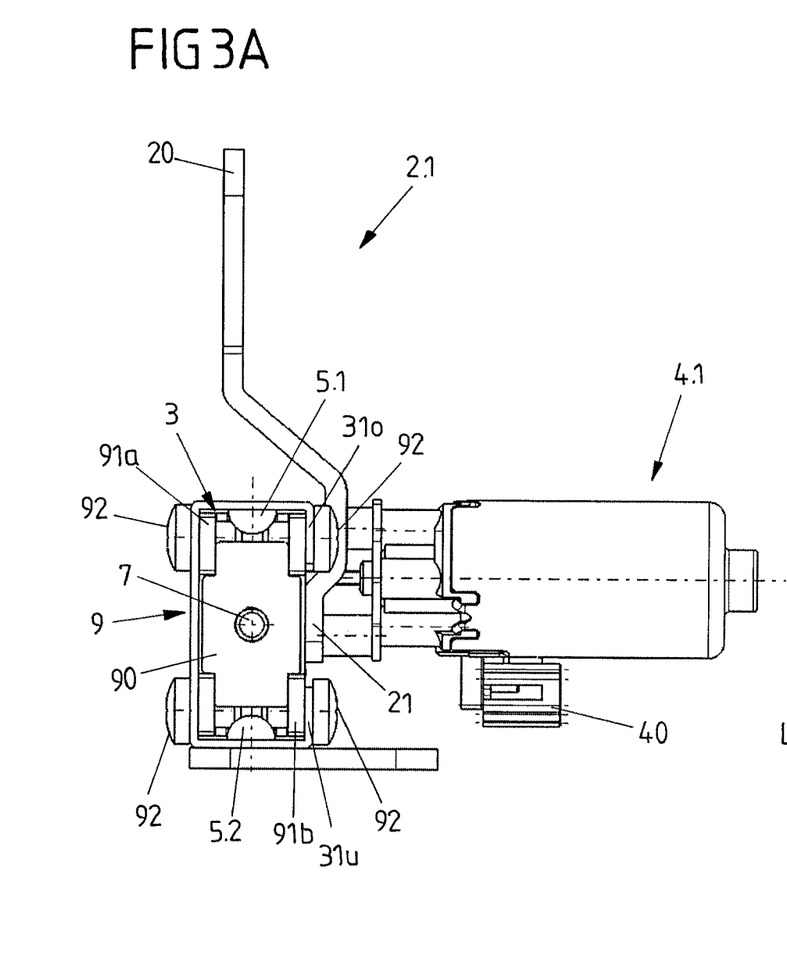
FIG. 3A shows a front view of the adjusting device of FIGS. 1 and 2 with a view to a screwed spindle holding member in the form of a spindle holding plate.
Figure 3B:
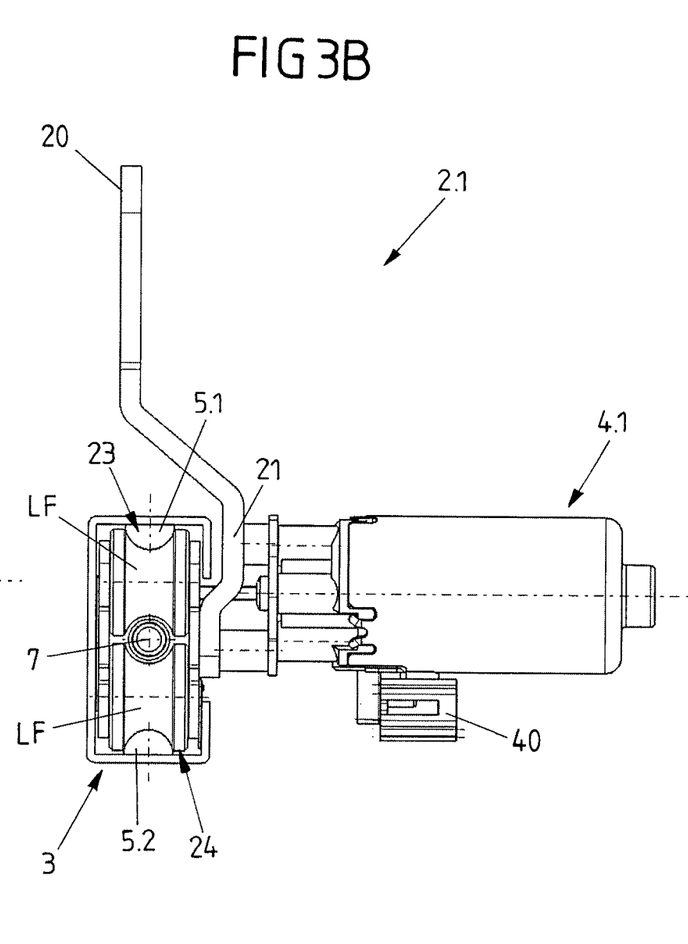
FIG. 3B shows a sectional view of the adjusting device of FIGS. 1, 2 and 3A transversely to the longitudinal axis of the spindle.

The spindle holding plate 90 shown in FIGS. 1, 2 and 3A is of cross-shaped design and with its laterally as well as upwardly and downwardly protruding portions is positively received between the arresting plates 91a and 91b facing each other. For positively receiving the laterally protruding portions of the spindle holding plate 90 each arresting plate 91a, 91b includes a corresponding cutout.

Via the spindle holding plate 90 one end of the rail 3 in the present case is closed almost completely. This reduces the risk of dirt entering into the cavity 30 of the rail 3. In addition, the end of the rail 3 is stiffened via the spindle holder 9 including the spindle holding plate 90 and the arresting plates 91a and 91b. In particular, both the spindle holding plate 90 and the lateral arresting plates 91a, 91b therefor are received within the cavity 30 of the rail 3. The spindle holding plate 90 together with the arresting plates 91a and 91b hence forms a spindle holding block that is screwed to the rail 3 and stiffens the rail profile. This can have a particularly advantageous effect on the loadability of the (single) rail 3.

The illustrated adjusting device 1A with a single rail 3 and carriages 2.1 and 2.2 independently adjustable thereon and each provided with their own drive 4.1, 4.2 can do without a continuous upper rail to which the seat base G would be fixed on a seat long side. Rather, there is provided a (longitudinal seat) adjusting device 1A that includes two separately adjustable adjusting units in the form of the carriages 2.1 and 2.2, which each define an articulation point/screw point for the seat base G. An adjusting device 1A or 1B thus is designed without a continuous upper rail, but with two short carriage-shaped upper rail pieces that are defined by the adjusting units 2.1 and 2.2. Thus, independently actuatable rocker drives for a front and a rear rocker of the seat base G can be provided on the single rail 3 in order to for example—in conjunction with a second adjusting device 1B corresponding to the rail assembly SA of FIG. 4—at least also adjust the inclination and/or the height of the seat base G with respect to the floor B by varying a distance between front and rear rockers. Via the carriages 2.1 and 2.2 adjustable relative to each other comparatively large strokes can be realized.

LIST OF REFERENCE NUMERALS 1A, 1B adjusting device
2.1, 2.2 carriage (adjusting unit)
20 bearing part
200 articulation point/screw point
21 flange portion
22, 23, 24, 25 roller (supporting element)
3 (single) rail 30 cavity
31o, 31u edge web
32 side wall
4.1, 4.2 drive
40 connection socket
5.1, 5.2 semicircular profile (guide profile)
6 roller assembly
60, 61 bearing plate
7 spindle
8 adjusting gear unit
80 gear unit housing
800 drive worm
801 spindle nut
81.1, 81.2 holding plate
9 spindle holder
90 spindle holding plate (spindle holding member)
91a, 91b arresting plate (arresting element)
92 screw (fastening element)
B floor
BS1, BS2 floor slot
F vehicle seat
G seat base
L longitudinal seat axis
LF running surface
R backrest
SA rail assembly
SE control unit

The invention claimed is:

1. An adjusting device for the longitudinal adjustment of a vehicle seat comprising
at least one rail for defining a longitudinal seat axis along which a seat base of the vehicle seat is adjustable, and
at least two shiftably guided adjusting units arranged one behind the other along the longitudinal seat axis, to which the seat base is to be fixed in order to be adjustable along the longitudinal seat axis,
wherein the at least one rail supports the at least two adjusting units and the at least two adjusting units are adjustable relative to each other along the longitudinal seat axis, and each adjusting unit is assigned a separate drive for a power-operated adjustment along the longitudinal seat axis.

2. The adjusting device according to claim 1, wherein at least one adjusting unit of the at least two adjusting units includes a bearing part for connection to a rocker of the seat base.

3. The adjusting device according to claim 1, wherein for the power-operated adjustment of at least one adjusting unit of the at least two adjusting units a spindle and a spindle nut meshing therewith are provided.

4. The adjusting device according to claim 3, wherein the spindle is stationary and two spindle nuts are provided, each spindle nut assigned to an adjusting unit of the at least two adjusting units and each spindle nut meshing with the spindle for the power-operated adjustment of the at least two adjusting units.

5. The adjusting device according to claim 3, wherein a longitudinal axis of the spindle extends substantially perpendicularly to a drive axis of the drive of an adjusting unit of the at least two adjusting units.

6. The adjusting device according to claim 1, wherein the adjusting device includes an electronic control unit for controlling the adjusting movements of the at least two adjusting units relative to each other.

7. The adjusting device according to claim 6, wherein the electronic control unit is equipped to vary a distance of the at least two adjusting units arranged one behind the other relative to each other along the longitudinal seat axis for a variation of an inclination and/or a height of the seat base and/or a cushion support arranged thereon.

8. The adjusting device according to claim 1, wherein
(a) the at least two adjusting units are shiftably mounted on one and the same rail or
(b) the adjusting device includes a first rail and a second rail and a first adjusting unit of the at least two adjusting units is shiftably mounted on the first rail and a second adjusting unit of the at least two adjusting units is shiftably mounted on the second rail.

9. The adjusting device according to claim 1, wherein at least one adjusting unit of the at least two adjusting units is shiftably mounted on the at least one rail via at least one supporting element.

10. The adjusting device according to claim 9, wherein the at least one supporting element at least one of
(a) slidingly rests against the rail and
(b) is rotatably mounted and can perform a rotary movement for shifting the adjusting unit along the longitudinal seat axis.

11. The adjusting device according to claim 9, wherein the at least one supporting element is supported on the rail or a component connected thereto.

12. The adjusting device according to claim 11, wherein the at least one supporting element is supported on a convexly curved guide profile that is integrally formed with the rail or that is configured as a separate component and is connected to the rail.

13. The adjusting device according to claim 9, wherein for the power-operated adjustment of at least one adjusting unit of the at least two adjusting units a spindle and a spindle nut meshing therewith are provided and the spindle is supported on the at least one supporting element.

14. The adjusting device according to claim 13, wherein at least two supporting elements are provided on an adjusting unit of the at least two adjusting units, the spindle extending through between the same.

15. The adjusting device according to claim 14, wherein at least two pairs of two supporting elements each arranged one behind the other along the longitudinal seat axis are provided on an adjusting unit and the spindle extends through the at least two pairs.

16. A vehicle seat with at least one adjusting device according to claim 1.

17. The vehicle seat according to claim 16, wherein the at least one rail and at least one adjusting unit of the at least two adjusting units are arranged below a floor of the vehicle and the floor includes a longitudinally extended cutout from which one bearing part of the at least one adjusting unit protrudes for the connection of the seat base to the at least one adjusting unit at the floor of the vehicle.

18. The vehicle seat according to claim 16, wherein the vehicle seat is adjustable via the at least one adjusting device along the longitudinal seat axis between a position in a first seat row and a position in a second seat row of the vehicle.

19. The vehicle seat according to claim 16, wherein the vehicle seat includes two adjusting devices each with at least two adjusting units arranged one behind the other along the longitudinal seat axis, to each of which a separate drive is assigned for the power-operated adjustment, and the total of at least four drives of the adjusting units are actuatable in pairs and/or individually in order to adjust an inclination and/or a height of the seat base or a cushion support arranged thereon relative to a floor of a vehicle via the at least two adjusting devices.

* * * * *